March 14, 1944.  L. D. HAGENBOOK  2,344,300
SHAKER CONVEYER TROUGH CONNECTING MEANS
Filed Jan. 18, 1943  3 Sheets-Sheet 1
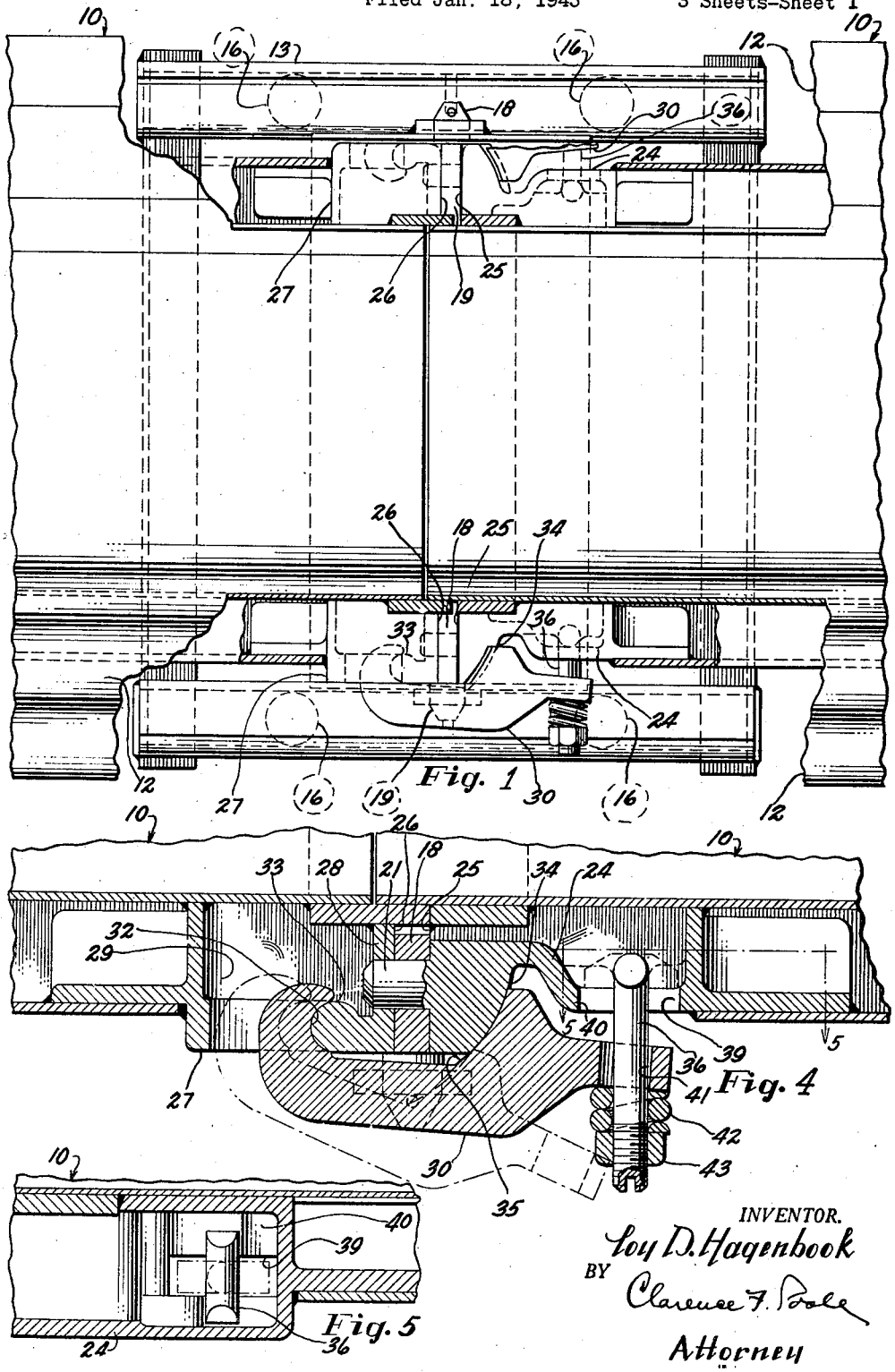
INVENTOR.
Loy D. Hagenbook
BY
Clarence F. Poole
Attorney March 14, 1944. L. D. HAGENBOOK 2,344,300
SHAKER CONVEYER TROUGH CONNECTING MEANS
Filed Jan. 18, 1943 3 Sheets-Sheet 2
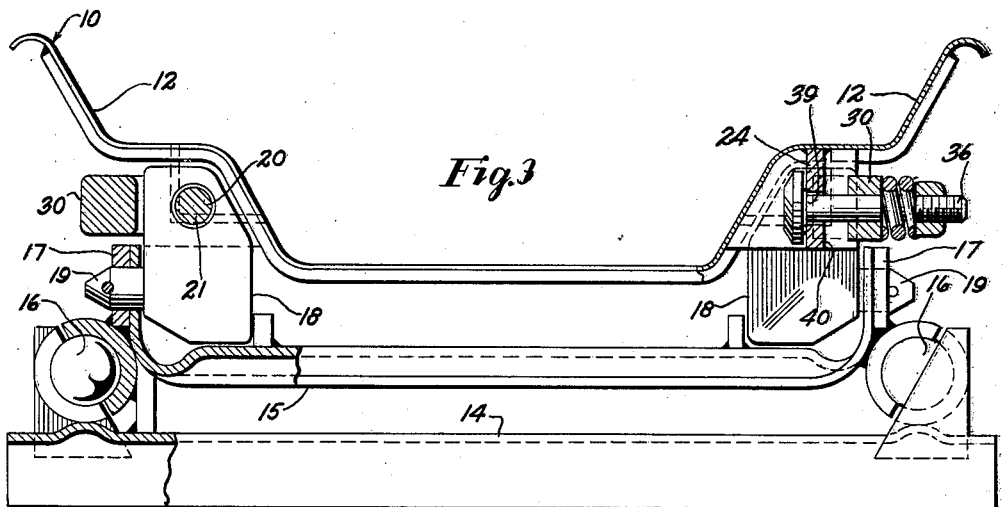
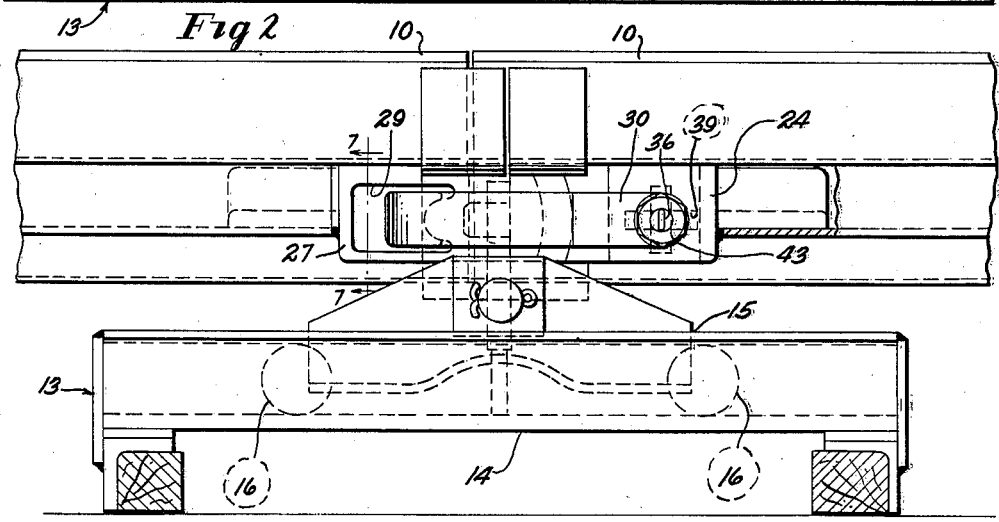
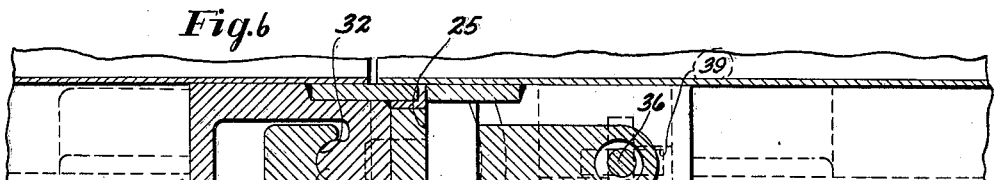
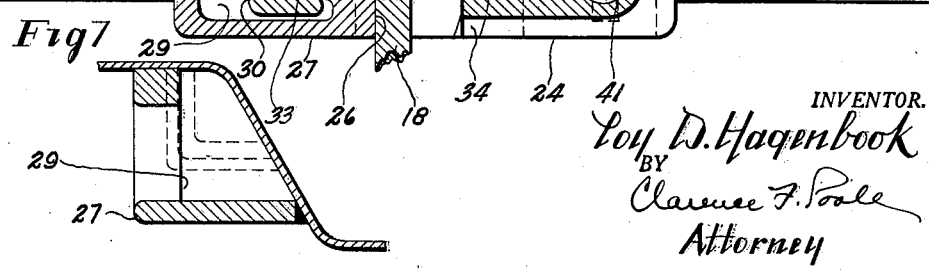
INVENTOR.
Loy D. Hagenbook
BY Clarence F. Poole
Attorney March 14, 1944.  L. D. HAGENBOOK  2,344,300
SHAKER CONVEYER TROUGH CONNECTING MEANS
Filed Jan. 18, 1943  3 Sheets-Sheet 3

INVENTOR
Loy D. Hagenbook
BY Clarence F. Poole
Attorney

Patented Mar. 14, 1944

2,344,300

UNITED STATES PATENT OFFICE 2,344,300

SHAKER CONVEYER TROUGH CONNECTING MEANS

Loy D. Hagenbook, Chicago, Ill., assignor to Goodman Manufacturing Company, Chicago, Ill., a corporation of Illinois Application January 18, 1943, Serial No. 472,668

8 Claims. (Cl. 198—220)

This invention relates to improvements in shaker conveyer trough connecting means and has as its principal objects to provide a simplified, novel form of connecting means for detachably connecting adjacent ends of the troughs of a shaker conveyer together in a more efficient and expeditious manner than formerly.

A more specific object of my invention is to provide a connecting means for connecting adjacent ends of a pair of shaker conveyer troughs together, which also serves to form a connecting and support means for the troughs on a reciprocably movable support therefor.

Other objects of my invention will appear from time to time as the following specification proceeds and with reference to the accompanying drawings wherein:

Figure 1 is a fragmentary plan view of adjacent ends of two troughs of a shaker conveyer trough line, with certain parts broken away and certain other parts shown in horizontal section in order to more clearly illustrate certain details of my invention;

Figure 2 is a view in side elevation of the troughs and supporting means therefor, shown in Figure 1;

Figure 3 is a fragmentary transverse sectional view showing certain details of the clamping means and the supporting connection between the reciprocably moving support and the troughs of the conveyer;

Figure 4 is an enlarged fragmentary horizontal sectional view showing certain details of the clamping means constructed in accordance with my invention;

Figure 5 is a partial fragmentary sectional view taken substantially along line 5—5 of Figure 4;

Figure 6 is a partial fragmentary detail longitudinal sectional view taken through the clamping means, showing certain other details thereof than are shown in Figures 4 and 5;

Figure 7 is a fragmentary transverse sectional view taken substantially along line 7—7 of Figure 2;

Figure 8:
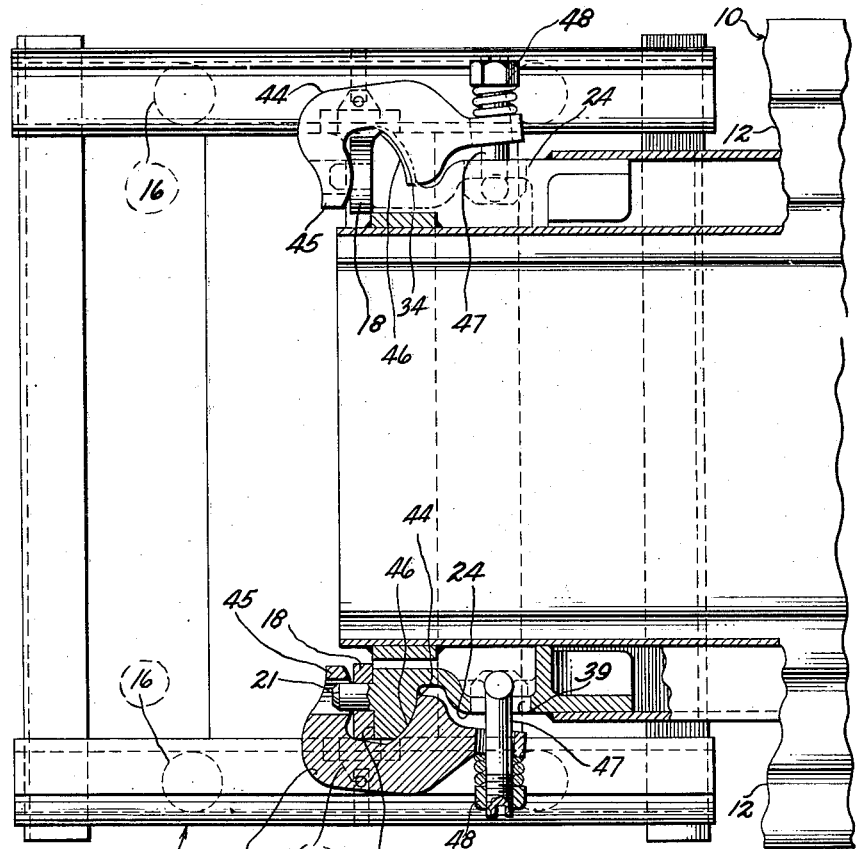
Figure 8 is a fragmentary plan view illustrating a modified form of my invention.

In the embodiment of my invention illustrated in the drawings, a pair of shaker conveyer troughs 10, 10 are shown as being connected in abutting relation with respect to each other. Said troughs are each of a usual construction having a flat bottom and outwardly inclined flared sides 12, 12, and while shown as being abutting troughs, may also be of a common form connected together in overlapping relation.

Adjacent ends of the troughs 10, 10 are reciprocably supported on a reciprocable supporting means, which is herein shown as being a ball frame 13. Said ball frame may be of any usual construction well known to those skilled in the art and as herein shown includes a lower frame member 14 held in fixed relation with respect to the ground as by jacks interposed between said frame member and the mine roof (not shown). An upper frame member 15 is mounted on said lower frame member for reciprocable movement with respect thereto on balls 16, 16, in the usual manner.

The upper frame member 15 of the ball frame 13 is provided with a pair of oppositely spaced longitudinally extending upright lugs 17, 17, to which are pivotally connected a pair of transversely extending connecting ears 18, 18 on transversely extending pivotal pins 19, 19, secured to and projecting outwardly from said ears (see Figure 4). Said connecting ears 18, 18 are each provided with an aperture 20, which extends therethrough in a direction longitudinally of the troughs 10, 10. Said apertures form a connecting means between said troughs and said ball frame, and are adapted to have pins 21, 21 extend therethrough, for supporting adjacent ends of said troughs on said ball frame. Said pins project longitudinally from the ends of connecting members 24, 24, which are secured to and project laterally from opposite sides of one end of one of the troughs 10. Opposite faces of said connecting ears are abutted by engaging faces 25, 25 of said connecting member 24, and engaging faces 26, 26 of connecting members 27, 27, which are secured to and project laterally from opposite sides of an adjacent end of the other trough 10. Said pins 21, 21 also extend through advance end walls 28, 28 of said connecting members 27, 27 to hold said connecting members in vertical alignment.

The clamping means for connecting adjacent ends of the troughs 10, 10 together and clamping said troughs to the connecting ears 18, 18, are the same for each side of said troughs, so the clamping means and the connection between said clamping means and the connecting members 24 and 27 on one side of said troughs only will here be described in detail. The connecting member 27 is provided with an open portion 29, extending to the rear of the advance wall 28 and within which is adapted to extend a hooked end of a clamping member 30. Said clamping member is of a substantially C-shaped formation, and the inner surface of said hooked end has a concave substantially ball-shaped engaging surface 32, which is adapted to engage a curved substantially ball-shaped engaging face 33, projecting from the outer end of the wall 28, in a direction opposite from the engaging face 26. The adjacent connecting member 24 is provided with a curved convex engaging face 34, curved in both vertical and horizontal directions to form a segment of a sphere. The transverse engaging surface of said engaging face is struck from a plurality of arcs, the radii of which are of a greater length than the radius of the largest arc from which the face 33 of the connecting member 27 is struck. Said curved engaging face 34 is adapted to be engaged by a corresponding inner curved engaging face 35 of the clamping member 30.

Thus, when the concave surface 32 of said clamping member has engagement with the engaging face 33, said engaging face 33 will serve as fulcrum for said clamping member. When said inner face 35 is engaged with the curved engaging face 34 and said clamping member is moved in a direction towards the laterally projecting connecting member 24, about said fulcrum, said clamping member will urge said connecting members and adjacent ends of the troughs 10, 10 towards each other.

When said clamping member has been moved inwardly about its fulcrum a distance sufficient to fully engage and clamp the faces 25 and 26 with opposite sides of the connecting ear 18 of the ball frame 13, it will hold said connecting members and adjacent ends of said troughs in clamped relation with respect to said connecting ears 18, 18 of the ball frame 13.

The means for moving the clamping member 30 about the fulcrum formed by the ball-shaped engaging face 33 of the connecting member 27 is herein shown as being a T-shaped bolt 36, the head of which is adapted to be inserted through a longitudinally extending slot 39, formed in an outer wall portion 40 of the connecting member 24. When the head of said bolt has been inserted through said slot it may be turned to a vertically extending position so as to engage the inside of said wall portion. Said bolt is also adapted to extend through an enlarged aperture 41 formed in an outer end of the clamping member 30, opposite the concave engaging surface 32. A spring 42 abuts the outer side of said clamping member and is interposed between the outer side of said clamping member and a nut 43, threaded on the end of said bolt.

The T-shaped bolt is normally adapted to be connected to the clamping member 30 at all times, the nut 43 being locked on said bolt by peening over the slotted end thereof. The clamping device and bolt are thus removed from the troughs as a unit, when they are disconnected, by first loosening said nut and then turning said bolt until the head thereof will fit through the slot 39.

Figure 9:
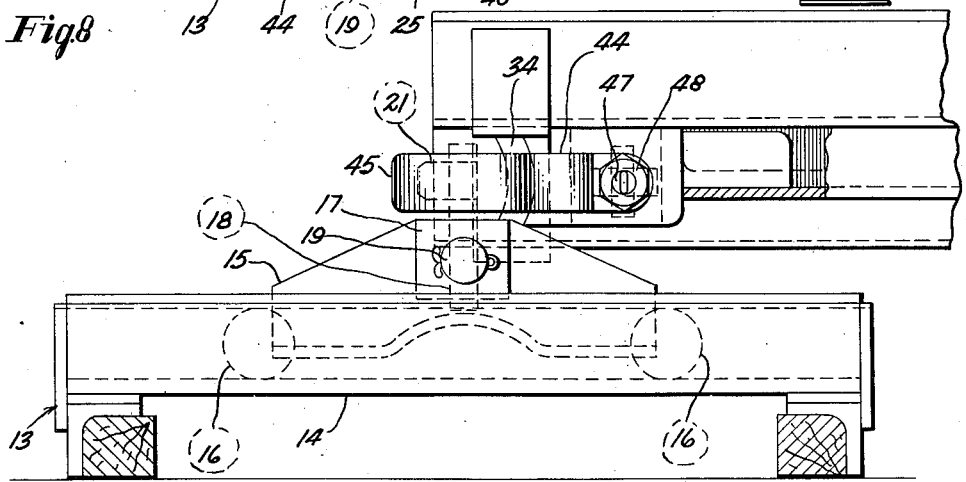
Figure 9 is a view in side elevation of the form of my invention shown in Figure 8.

In Figures 8 and 9 a modified form of clamping device is shown which serves to support an end trough 10 of the conveyer on the ball frame 13. In this form of the invention a clamping device 44 is provided. Said clamping device is of a C-shaped formation and is similar to the clamping device 30, but has an apertured outer end 45, the apertured portion of which fits around the projecting pin 21 of the connecting member 24. Said clamping device is provided with a curved engaging surface 46, adapted to engage the curved engaging surface 34 of the connecting member 24, and is moved in a direction towards said connecting member by means of a T-shaped bolt 47 having a nut 48 on the end thereof, in a manner similar to which the clamping member 30 is moved into clamping engagement with the engaging face 34 of its associated connecting member 24.

One inner end of said clamping member thus abuts an outer face of the connecting ear 18 of the ball frame 13 and the other inner end of said clamping member abuts the engaging face 34 of the connecting member 24, and said clamping member serves to clamp said connecting ear to the engaging face 25 of said connecting member so said connecting ear will support one side of the trough 10 on the ball frame 13, it being understood that the two connecting ears serve to support the adjacent end of said trough on said ball frame.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a connecting means for a pair of shaker conveyer troughs, a connecting member projecting laterally from one end of one of said troughs, another connecting member projecting laterally from an adjacent end of said other trough, an interengaging connection between said members, and a clamping member having engaging connection with oppositely disposed faces of said members, one of said faces serving as a fulcrum for said clamping member, and said clamping member having a concave engaging surface adapted to pivot about said face forming the fulcrum for said clamping member, and having another spaced facing concave engaging surface having slidable wedging engagement with said opposite face, so that movement of said clamping member about said fulcrum and towards said other connecting member will draw said troughs together.

2. In a connecting means for a pair of shaker conveyer troughs, a connecting member projecting laterally from one end of one of said troughs, another connecting member projecting laterally from an adjacent end of said other trough, an interengaging connection between said members, and a clamping member having engaging connection with oppositely disposed faces of said members, one of said faces serving as a fulcrum for said clamping member, and said clamping member having a concave engaging surface adapted to pivot about said face forming the fulcrum for said clamping member, and having another spaced facing concave engaging surface having slidable wedging engagement with said opposite face, so that movement of said clamping member about said fulcrum and towards said other connecting member will draw said troughs together, and means having engagement with one of said connecting members and an end of said clamping member for pivotally moving said clamping member about said fulcrum towards said troughs, to draw said troughs together, and for holding said clamping member in fixed relation with respect to said troughs, to hold said troughs in connected relation with respect to each other.

3. In a connecting means for a pair of shaker conveyer troughs, a connecting member projecting laterally from one end of one of said troughs, another connecting member projecting laterally from an adjacent end of said other trough, one of said connecting members having a portion adapted to register for engagement with said other member, to hold adjacent ends of said troughs in vertical alignment with respect to each other, and a clamping member for drawing said connecting members together and for holding them in connected relation with respect to each other, said clamping member having a curved engaging portion adapted to engage an engaging face of one of said connecting members and having an opposite curved engaging portion adapted to engage an engaging face of said other connecting member, for drawing said connecting members together, upon pivotal movement of said clamping member about one of said engaging faces in a direction towards said troughs, and means connected between one of said connecting members and an end of said clamping member, for pivotally moving said clamping member about said other connecting member and for holding said clamping member in a fixed position, to clamp said connecting members in fixed relation with respect to each other.

4. In a connecting means for a pair of shaker conveyer troughs, a connecting member projecting laterally from one end of one of said troughs, another connecting member projecting laterally from an adjacent end of said other trough, one of said members having a portion adapted to register for engagement with said other member, to hold adjacent ends of said troughs in vertical alignment with respect to each other, and a clamping member for drawing said connecting members together and for holding them in connected relation with respect to each other, said clamping member having a curved inner portion adapted to engage an engaging face of one of said connecting members and having an opposite curved inner engaging portion adapted to engage a correspondingly formed engaging face of said other connecting member, said engaging faces of said connecting members being struck from arcs of different radii, and said curved portions of said clamping member being struck from arcs of radii corresponding to the radii of the arcs of said associated engaging faces of said connecting members, so said clamping member may move about one of said engaging faces as a fulcrum and engage and draw said other connecting member towards said fulcrum with a wedging action, upon pivotal movement of said clamping member towards said troughs.

5. In a connecting means for a pair of shaker conveyer troughs, a connecting member projecting laterally from one end of one of said troughs, another connecting member projecting laterally from an adjacent end of said other trough, one of said members having a portion adapted to register for engagement with said other member, to hold adjacent ends of said troughs in vertical alignment with respect to each other, and a clamping member for drawing said connecting members together and for holding them in connected relation with respect to each other, said clamping member having a socket portion adapted to engage a complementary engaging face of one of said connecting members and having an opposite curved engaging portion adapted to engage an engaging face of said other connecting member, said engaging face of said member engaged by said socket serving as a fulcrum about which said clamping member may pivot, and said engaging face of said other connecting member being struck from an arc of a substantially larger radius than the radius of the largest arc of said socket and serving to move said troughs together upon movement of said clamping member about said fulcrum in a direction towards said troughs.

6. In a connecting means for a pair of shaker conveyer troughs, a connecting member projecting laterally from one end of one of said troughs, another connecting member projecting laterally from an adjacent end of said other trough, one of said members having a portion adapted to register for engagement with said other member, to hold adjacent ends of said troughs in vertical alignment with respect to each other, and a clamping member for drawing said members together and for holding them in connected relation with respect to each other, said clamping member having a socket portion adapted to engage a complementary engaging face of one of said connecting members and having an opposite curved engaging portion adapted to engage an engaging face of said other connecting member, said engaging face of said connecting member engaged by said socket serving as a fulcrum about which said clamping member pivots, and said engaging face of said other connecting member being struck from an arc of a substantially larger radius than the radius of the largest arc of said socket and serving to move said troughs together upon movement of said clamping member about said fulcrum in a direction towards said troughs, and means for pivoting said clamping member about said fulcrum in a direction to draw said troughs together and for holding said clamping member in position to hold said troughs in connected relation with respect to each other.

7. In a shaker conveyer and in combination with a shaker conveyer trough, a reciprocably movable support for an end of said trough including a reciprocably movable support frame having a pair of laterally spaced upright connecting ears, and means for connecting said trough to said ears including a pair of connecting members projecting laterally from an end of said trough and having portions adapted to register for engagement with said ears, and clamping devices adapted to engage the outer sides of said ears and register with the ends of said portions registering for engagement with said ears and pivot thereabout, and to have wedging engagement with said connecting members, to move said connecting members into engagement with said ears by pivotal movement towards said trough about the sides of said ears opposite said connecting members, and means for pivotally moving said clamping devices towards said trough and for holding said clamping devices from movement with respect to said connecting members, to hold said trough in connected relation with respect to said ears.

8. In a shaker conveyer and in combination with a pair of conveyer troughs, a reciprocably movable support for said troughs including a reciprocably movable support frame having a pair of laterally spaced upright connecting ears, means for connecting said trough sections together and to said ears including a pair of laterally projecting connecting members, projecting from opposite sides of adjacent ends of said troughs and adapted to abut opposite sides of said ears, one pair of said connecting members having portions adapted to register for engagement with said ears and with said other connecting members, clamping devices adapted to engage oppositely disposed faces of said connecting members and move said connecting members in engagement with opposite sides of said ears by movement about said connecting members on one side of said ears as fulcrums, in directions towards said troughs, each of said clamping devices having a face adapted to slidably engage said connecting member forming the fulcrum for said clamping member, and pivot thereabout, and having an opposite face adapted to slidably engage said opposite connecting member, to draw said troughs together by movement about said fulcrum, and means for moving said clamping devices about said one pair of connecting members as fulcrums and holding said clamping devices from movement with respect to said connecting members, to hold said troughs in connected relation with respect to each other.

LOY D. HAGENBOOK.